US006609194B1

(12) United States Patent
Henry et al.

(10) Patent No.: US 6,609,194 B1
(45) Date of Patent: Aug. 19, 2003

(54) APPARATUS FOR PERFORMING BRANCH TARGET ADDRESS CALCULATION BASED ON BRANCH TYPE

(75) Inventors: G. Glenn Henry, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 0 days.

(21) Appl. No.: 09/438,907

(22) Filed: Nov. 12, 1999

(51) Int. Cl.$^7$ ................................................. G06F 9/38
(52) U.S. Cl. ...................... 712/238; 712/233; 712/234; 712/239; 711/213
(58) Field of Search ................................. 712/234, 233, 712/238, 239, 240; 711/213

(56) References Cited

U.S. PATENT DOCUMENTS

| | | | | | |
|---|---|---|---|---|---|
| 5,978,909 | A | * | 11/1999 | Lempel | ...................... 712/240 |
| 6,088,793 | A | * | 7/2000 | Liu et al. | ..................... 712/239 |
| 6,279,106 | B1 | * | 8/2001 | Roberts | ....................... 712/239 |

OTHER PUBLICATIONS

Stark et al., "Variable Length Path Branch Prediction," *Proceedings of the Eighth International Conference on Architectural Support for Programming Languages and Operating Systems*, ACM, pp. 170–179, Oct., 1998.*
Chang et al., "Target Prediction for Indirect Jumps," *Proceedings of the 24th International Symposium on Computer Architecture*, ACM, pp. 274–283, May, 1997.*
Jacobsen et al., "Control Flow Speculation in Multiscalar Processors," *Third International Symposium on High Performance Computer Architecture*, IEEE, pp. 218–229, Feb. 1–5, 1997.*
Driesen et al., "Accurate Indirect Branch Prediction," *Proceedings of the 25th Annual International Symposium on Computer Architecture*, ACM, pp. 167–178, Jun., 1998.*
Kaeli et al., "Branch History Table Prediction of Moving Target Branches Due to Subroutine Returns," *Proceedings of the 18th Annual International Symposium on Computer Architecture*, ACM, pp. 34–42, May, 1991.*
AMD–K6 MMX Enhanced Processor Data Sheet, 1997. Section 2.7.
omputer Architecture: A Quantitative Approach, $2^{nd}$ ed. Patterson and Hennessy, Morgan Kaufmann Publishers, 1990. Section 4.3.

* cited by examiner

Primary Examiner—William M. Treat
(74) Attorney, Agent, or Firm—E. Alan Davis; James W. Huffman (57) ABSTRACT

A branch target address prediction mechanism is provided. A branch target buffer (BTB) is employed to predict target address only of indirect branch instructions. Return addresses are predicted from a call/return stack and PC-relative branch instructions are predicted by directly calculating the target address using a program counter-relative displacement specified in the instruction. Because the BTB only stores indirect branch instruction target addresses, the likelihood of aliasing collisions in the BTB is greatly reduced, thereby increasing the prediction accuracy of the BTB.

12 Claims, 6 Drawing Sheets

| NEAR; PC-RELATIVE; CONDITIONAL | JCC/JCXE, LOOP/LOOPE/LOOPNE |
| NEAR; PC-RELATIVE; UNCONDITIONAL | JMP, CALL |
| NEAR; INDIRECT | JMP, CALL, RETURN |
| FAR; INDIRECT | JMP, CALL, RETURN |
| FAR; IMMEDIATE | JMP, CALL |

431 — stores predicted branch target addresses only of indirect branch instructions and does not make Taken/Not Taken prediction

APPARATUS FOR PERFORMING BRANCH TARGET ADDRESS CALCULATION BASED ON BRANCH TYPE

BACKGROUND OF THE INVENTION

1. Field of the Invention

This invention relates in general to the field of pipelined microprocessor architecture, and more particularly to branch instruction target address prediction.

2. Description of the Related Art

Computer instructions are typically stored in successive addressable locations within a memory. When processed by a Central Processing Unit (CPU), the instructions are fetched from consecutive memory locations and executed. Each time an instruction is fetched from memory, a program counter, or instruction pointer, within the CPU is incremented so that it contains the address of the next instruction in the sequence. This is the next sequential instruction pointer. Fetching of an instruction, incrementing of the program counter, and execution of the instruction continues linearly through memory until a program control instruction is encountered.

A branch instruction, or program control instruction, when executed, changes the address in the program counter to some value other than the next sequential instruction address and thereby causes the flow of control to be altered. In other words, program control instructions specify conditions for altering the contents of the program counter. The change in the value of the program counter as a result of the execution of a branch instruction causes a break in the sequence of instruction execution. This is an important feature in digital computers, as it provides control over the flow of program execution and a capability for branching to different portions of a program. Examples of branch instructions include Jump, Test and Jump conditionally, Call, Return and Loop.

A Jump instruction causes the CPU to unconditionally change the contents of the program counter to a specific value, i.e., to the target address for the instruction where the program is to continue execution. A Test and Jump conditionally causes the CPU to test the contents of a status register, or possibly compare two values, and either continue sequential execution or jump to a new address, called the target address, based on the outcome of the test or comparison. A Call instruction causes the CPU to unconditionally jump to a new target address, but also saves the value of the program counter to allow the CPU to return to the program location it is leaving. A Return instruction causes the CPU to retrieve the value of the program counter that was saved by the last Call instruction, and return program flow back to the retrieved instruction address. A Loop instruction causes the CPU to decrement an iteration count in a register and conditionally change the contents of the program counter to a target address specified in the instruction if the iteration count has not reached zero.

In early microprocessors, execution of program control instructions did not impose significant processing delays because such microprocessors were designed to execute only one instruction at a time. If the instruction being executed was a program control instruction, by the end of execution the microprocessor would know whether it should branch, and if it was supposed to branch, it would know the target address of the branch. Thus, whether the next instruction was sequential, or the result of a branch, it would be fetched and executed.

Modern microprocessors are not so simple. Rather, it is common for modern microprocessors to operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif., 1996. The authors go on to provide the following excellent illustration of pipelining:

> A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Thus, as instructions are fetched, they are introduced into one end of the pipeline. They proceed through pipeline stages within a microprocessor until they complete execution. In such pipelined microprocessors it is often not known whether a branch instruction will alter program flow until it reaches a late stage in the pipeline. However, by this time, the microprocessor has already fetched other instructions and is executing them in earlier stages of the pipeline. Furthermore, even if the branch instruction is an unconditional branch instruction, the target address of the unconditional branch instruction may not be available until a later stage in the pipeline or must be fetched from memory. If a branch causes a change in program flow, all of the instructions in the pipeline that followed the branch must be thrown out. In addition, the instruction specified by the target address of the branch instruction must be fetched. Throwing out the intermediate instructions, and fetching the instruction at the target address creates processing delays in such microprocessors.

To alleviate this delay problem, many pipelined microprocessors use branch outcome prediction and branch target address prediction mechanisms in an early stage of the pipeline, and then fetch subsequent instructions according to the branch outcome and branch target address predictions.

A popular branch prediction scheme uses a branch target buffer (BTB) to make predictions about conditional branch instruction outcomes and to predict branch target addresses. A typical BTB is similar to a cache, where a given BTB entry is indexed by the address of a branch instruction that is being predicted. The data in the selected BTB entry includes the branch target address of the previous execution of the associated branch instruction and its outcome, i.e., whether the branch was taken or not taken. There is a high probability that the target address of the previous execution of the branch will also be the target address for the next execution of the branch. The next time the branch instruction is decoded, its address is used to index the BTB. The BTB generates a target address and outcome prediction for the branch instruction that can then be used to fetch subsequent instructions, in hopes that the target address was correctly predicted.

Like a cache, the BTB has many fewer entries than the memory address space it serves. That is, the entire address of the branch instruction is not used to index the BTB, but rather, only the lower bits are used. Therefore, a BTB suffers the same aliasing, or mapping, problems that a cache suffers. That is, two distinct branch instructions may index to the same BTB entry.

For example, assume two branch instructions A and B have the same lower address bits used to index the BTB. Assume branch A executes and its target address is updated in the BTB, and then branch B executes and its target address is updated in the same entry in the BTB, and then branch A executes again. The BTB will not contain the correct predicted target for branch A because it was replaced by the target address of branch B's last execution. This is true although the target address for branch A's last execution, i.e., probably the correct target address prediction, had been previously available in the BTB, but was replaced due to aliasing.

One means of minimizing this problem is to employ a set associative BTB, similar to set associative caches. However, set associative BTB's do not completely solve the problem. As microprocessor pipeline depths continue to increase, resulting in more severe performance degradation when branches are mispredicted, a demand for even greater branch prediction accuracy is apparent.

Therefore, what is needed is a BTB in a branch prediction mechanism that more accurately predicts branch target addresses.

SUMMARY

To address the above-detailed deficiencies, it is an object of the present invention to provide a more accurate branch target address predictor. Accordingly, in attainment of the aforementioned object, it is a feature of the present invention to provide a branch instruction target address predictor. The branch instruction target address predictor includes an instruction pointer register that stores an address at which instructions are fetched, a branch target buffer that stores target addresses related only to indirect branch instructions, and decode logic, coupled to the branch target buffer and the instruction pointer register, for decoding an instruction and providing one of the target address from the branch target buffer to the instruction pointer register if the instruction is an indirect branch instruction.

An advantage of the present invention is that it provides improved branch target address prediction by not populating the BTB with return addresses and direct branch instruction addresses, thereby reducing the probability of branch instruction aliasing in the branch target buffer. Another advantage of the present invention is that it enables a smaller branch target buffer to be employed since the branch target buffer is only predicting target addresses for one type of branch instruction and is not predicting whether conditional branches will be taken or not taken.

In another aspect, it is a feature of the present invention to provide an apparatus for predicting target addresses of branch instructions in a pipelined microprocessor. The apparatus includes a call/return stack that stores target addresses related to return instructions, an adder that calculates target addresses related to direct branch instructions, and a branch target buffer that stores target addresses related to indirect branch instructions. The predictor selects a target address provided by the stack, the calculator or the buffer for use by the microprocessor in fetching program instructions in response to determining if a branch instruction is a return, direct branch or indirect branch instruction.

In yet another aspect, it is a feature of the present invention to provide a method for predicting branch target addresses. The method includes fetching a branch instruction, determining if the branch instruction is a return instruction, a direct branch instruction or an indirect branch instruction, selecting a predicted target address of the branch instruction provided by a call/return stack, an adder or a branch target buffer, respectively, in response to determining the type of the branch instruction, and fetching a next instruction using the predicted target address in response to selecting the predicted target address.

BRIEF DESCRIPTION OF THE DRAWINGS

These and other objects, features, and advantages of the present invention will become better understood with regard to the following description, and accompanying drawings where.

DETAILED DESCRIPTION

Figure 1:
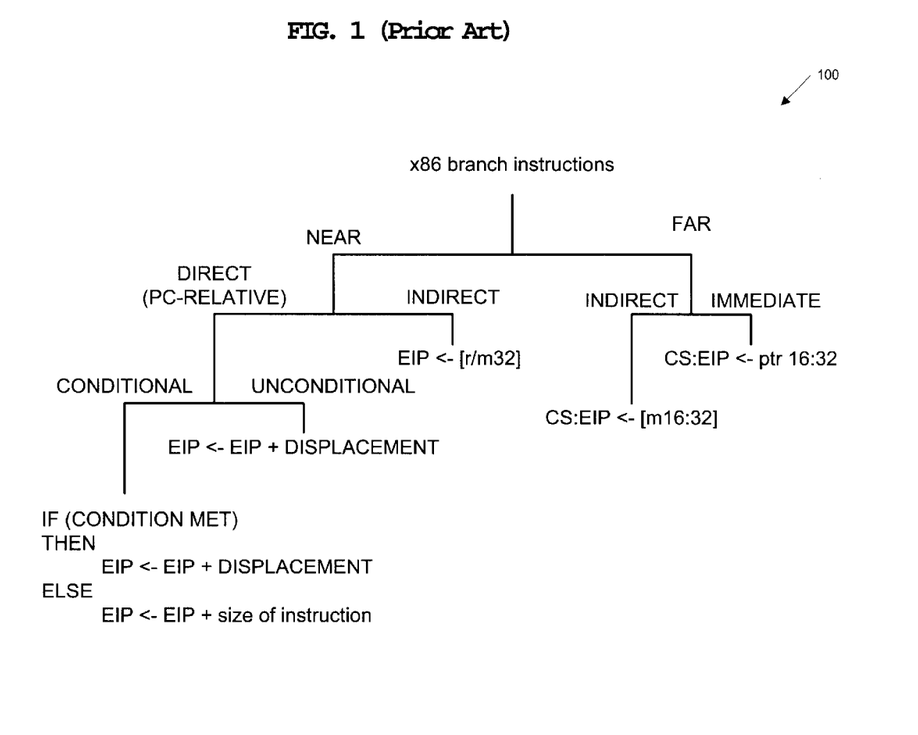
FIG. 1 is a related art tree diagram illustrating the branch types of the various x86 branch instructions.

Referring to FIG. 1, a tree diagram 100 illustrating the branch types of the various x86 branch instructions is shown. Branch instructions in the x86 architecture comprise near and far branches. Far branches are branches that require an update of the code segment (CS) register. In contrast, near branches do not require an update of the CS register. Far branches are divided into indirect and immediate far branches. An indirect far branch specifies that the CS register and the instruction pointer (EIP) register be updated with the contents of a memory location specified in the instruction. An immediate far branch specifies that the CS and EIP registers be updated with the contents of an immediate field specified in the instruction.

Near branches are divided into direct and indirect near branches. An indirect near branch specifies that the EIP register be updated with the contents of either a register or a memory location specified in the instruction. A direct near branch, also known as a PC-relative branch (PC, or program counter, is another term for instruction pointer), specifies that the EIP register be updated with the previous EIP value added to a displacement value specified in the near direct branch instruction. Near direct branch instructions my be either unconditionally executed- or executed only if a condition specified in the instruction is satisfied. If the condition is not satisfied, then the EIP is incremented by the size of the near direct branch instruction.

Although FIG. 1 describes x86 branch instructions in terms of 32-bit mode operation, the present invention is applicable to 16-bit mode operation as well.

Figure 2:
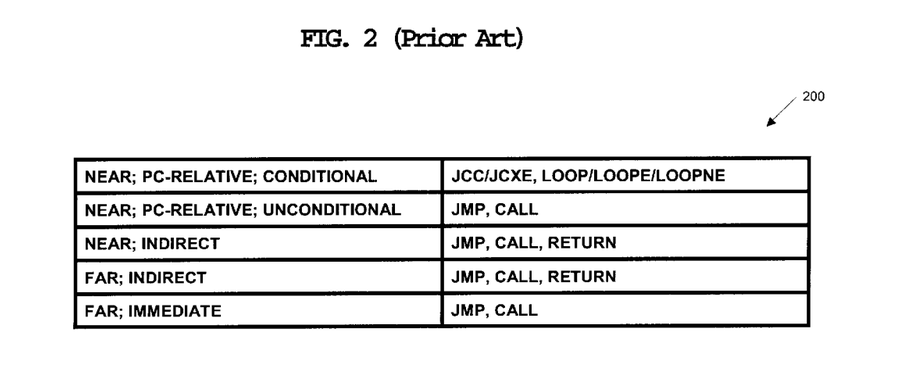
FIG. 2 is a related art table of x86 branch types of FIG. 1 and associated branch instructions of each branch type.

Referring now to FIG. 2, a related art table 200 of the five x86 branch types of FIG. 1 and associated branch instructions of each branch type is shown. Details of the various branch instructions may be obtained from the Intel Pentium Processor Family Developer's Manual Volume 3: Architecture and Programming Manual, 1995, which is hereby incorporated by reference.

Figure 3:
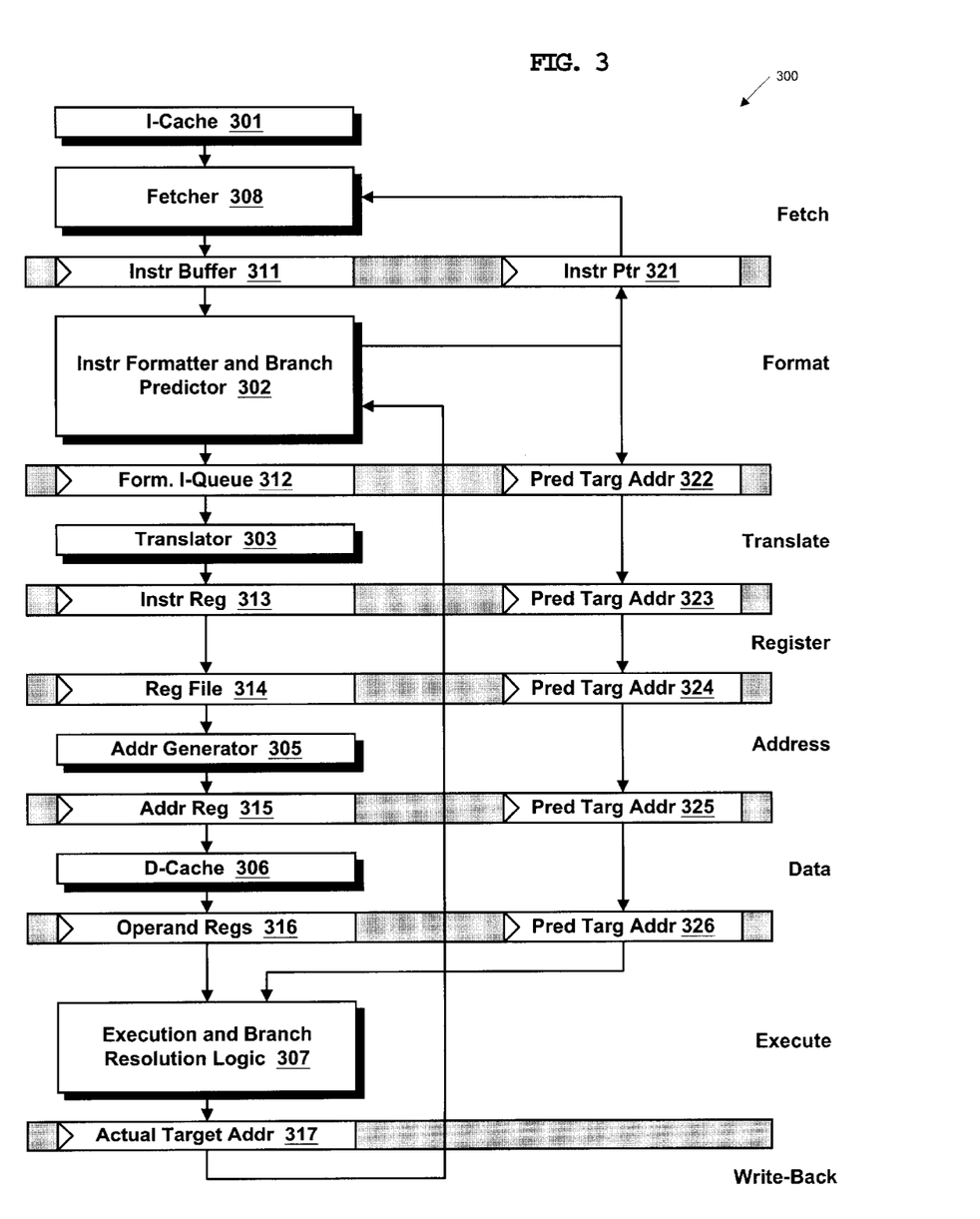
FIG. 3 is a block diagram of a pipelined microprocessor including a branch target address prediction mechanism according to the present invention.

Referring now to FIG. 3, a block diagram of a pipelined microprocessor 300 including a branch target address prediction mechanism 302 according to the present invention is shown. The microprocessor 300 comprises eight stages: Fetch, Format, Translate, Register, Address, Data, Execute and Write-Back stages as shown. Although microprocessor 300 shown in FIG. 3 comprises eight stages, it will be understood by one skilled in the art that the present invention may be used in a pipelined microprocessor with a different number of stages.

The Fetch stage comprises an instruction cache 301 that stores program instructions cached from a memory (not shown). A fetcher 308 in the Fetch stage fetches x86 instructions, such as branch instructions, from the instruction cache 301 into an instruction buffer 311. An instruction pointer register 321 provides an instruction pointer to the fetcher 308. The fetcher 308 fetches instructions from the instruction cache 301 into the instruction buffer 311 based on the instruction pointer.

The Format stage includes instruction formatter and branch predictor 302, which performs branch instruction target address prediction. The branch target address predictor 302 receives a stream of instruction bytes from the instruction buffer 311, formats the stream into distinct formatted instructions, and provides the formatted instructions to a formatted instruction queue 312. In particular, branch target address predictor 302 decodes the instruction stream and determines that a branch instruction has been fetched. Furthermore, the branch target address predictor 302 determines the type of branch instruction fetched.

The branch target address predictor 302 updates the instruction pointer in instruction pointer register 321. The branch target address predictor 302 also stores the predicted branch target address in a predicted target address register 322.

The branch target address predictor 302 receives an actual target address of a branch instruction from actual target address register 317. The branch target address predictor 302 predicts the target address of branch instructions based upon the instruction stream, the instruction pointer and the actual target address and updates the instruction pointer register 321 with the predicted branch target address. This operation will be described below in more detail.

The Translate stage includes a translator 303 that receives formatted x86 instructions from the formatted instruction queue 312 and translates the x86 instructions into micro instructions, or micro operations, which are provided to an instruction register 313. As a micro instruction associated with an x86 branch instruction is stored into the instruction register 313, the predicted branch target address associated with the x86 branch instruction from which the micro instruction was translated is forwarded from predicted target address register 322 to predicted target address register 323. As the micro instruction proceeds down through the various stages of the pipeline, its associated predicted target address is also piped down with it via predicted target address registers 324, 325 and 326. The predicted branch target address will later be used to determined whether the predicted branch target address is correct.

The Register stage includes a register file 314 that stores instruction operands. The register stage retrieves operands specified by the micro operations from register file 314 for use by later stages in the pipeline. For example, operands used to calculate actual branch target addresses may be stored in register file 314.

The Address stage includes an address generator 305 that generates addresses. For example, the address generator 305 generates memory addresses for load and store micro instructions, i.e., for instructions that cause memory accesses. The address generator 305 generates addresses from operands stored in the register file 314 as specified in the micro instructions. In particular, an x86 RET instruction is translated into, inter alia, a load micro instruction, for loading the actual return target address into the microprocessor 300. Conversely, an x86 CALL instruction is translated into a store micro instruction, for storing its return target address on the stack in memory. The address generator 305 stores the generated addresses in an address register 315.

In addition, the address generator 305 generates the actual branch instruction target addresses, except for return instruction addresses, which are retrieved from the memory stack, as just described. As may be observed, the branch predictor 302 in the embodiment of FIG. 3 advantageously generates the predicted branch target address three clock cycles before address generator 305 generates the actual branch target address. Thus, in the embodiment of FIG. 3, the branch target address predictor 302 allows the fetcher 308 to begin fetching instructions at the target address of a taken branch instruction three clock cycles sooner than it would without the branch target address predictor 302. The earlier fetching potentially results in fewer conditions in which some stages of the pipeline are idle, thereby improving overall processor performance.

The Data stage includes a data cache 306 that stores data cached from memory (not shown). The data cache 306 is accessed using the address stored in the address register 315, such as addresses of load and store micro instructions associated with return and call instructions. The retrieved data, such as a return instruction target address, is stored in operand registers 316. In the case of a branch instruction other than a return instruction, the actual branch target address generated by the address generator 305 is provided from the address register 315 to the operand register 316.

The Execute stage includes execution and branch resolution logic 307. The execution and branch resolution logic 307 performs execution of the micro instructions, such as performing arithmetic, logical or shift operations, and loading or storing data. The execution and branch resolution logic 307 also resolves branch instructions. That is, the execution and branch resolution logic 307 determines the outcome of a conditional branch instruction by determining if the specified condition was met.

Furthermore, the execution and branch resolution logic 307 determines whether branch target addresses predicted by the branch target address predictor 302 are correct. The execution and branch resolution logic 307 receives the actual branch target address from the operand registers 316 and the predicted branch target address from predicted target address register 326 and compares the two addresses to determine if the predicted address is correct. The actual target address is stored in a result register 317, or actual target address register 317.

If the execution and branch resolution logic 307 determines that the predicted branch target address is incorrect, it notifies the branch target address predictor 302. The branch predictor 302 causes the actual target address to be loaded into the instruction pointer register 321 to effect fetching of x86 instructions from the actual target address. In addition, if the branch instruction is an indirect branch instruction, a branch target buffer in the branch target address predictor 302, described below, is updated with the actual target address.

Figure 4:
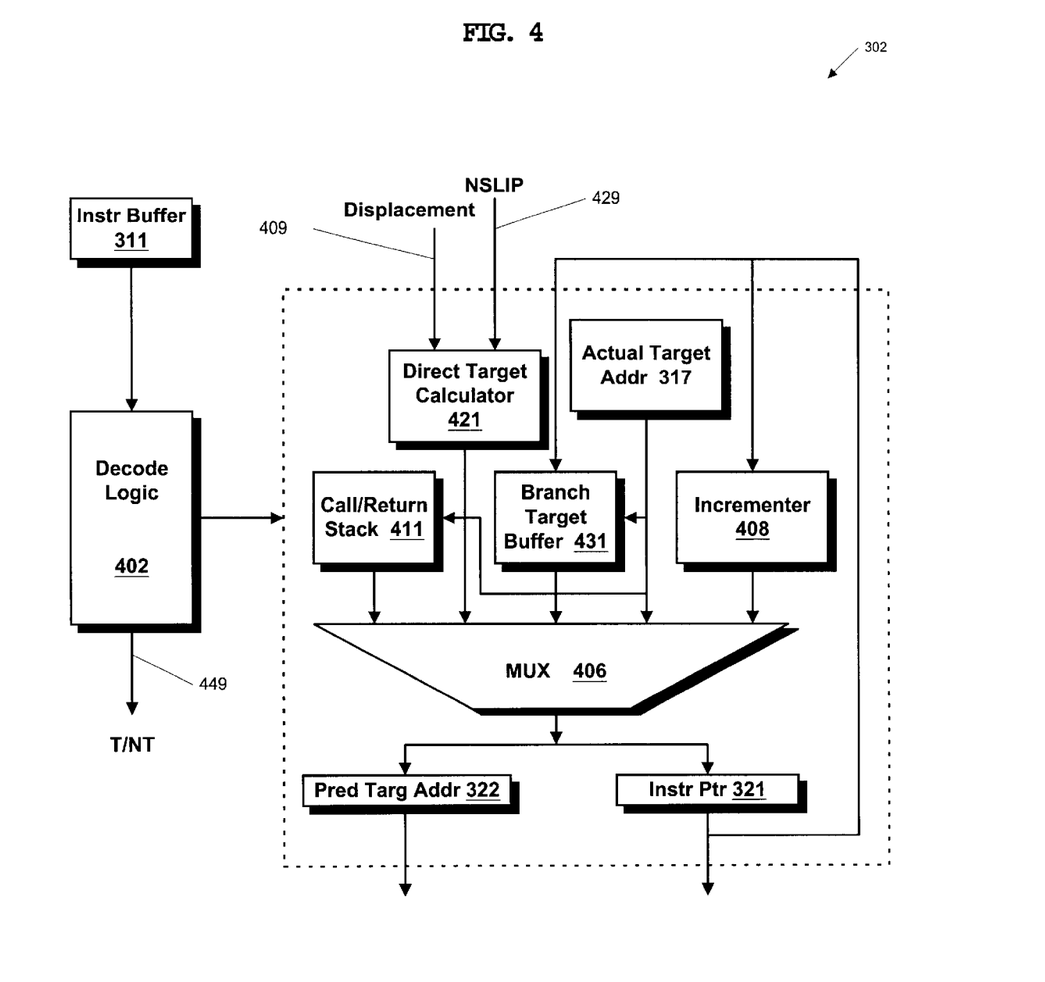
FIG. 4 is a detailed block diagram of the branch target address prediction mechanism of FIG. 3 according to the present invention.

Referring now to FIG. 4, a block diagram illustrating in detail the branch target address predictor 302 of FIG. 3 is shown. Throughout the drawings, like elements are numbered identically for clarity and simplicity. The branch target address predictor 302 comprises decode logic 402 that receives x86 instructions from instruction buffer 311. Decode logic 402 controls various elements of the branch target address predictor 302 in order to make predictions of target addresses of branch instructions.

In addition, decode logic 402 makes predictions about whether a conditional branch instruction will be taken or not taken on T/NT signal 449 in response to the received x86instructions. Advantageously, decode logic 402 makes predictions about the outcome of conditional branch instructions independent of predictions of the target address of a branch instruction made by the branch target address predictor 302, as will be described below.

For a detailed description of how the branch predictor 302 predicts whether a conditional branch instruction will be taken or not taken, the reader is referred to the following U.S. Patent Applications, all having a common assignee, and all of which are hereby incorporated by reference: METHOD AND APPARATUS FOR SPECULATIVELY UPDATING GLOBAL BRANCH HISTORY, Ser. No. 09/203,844 METHOD AND APPARATUS FOR PERFORMING BRANCH PREDICTION UTILIZING BRANCH TEST TYPE, Ser. No. 09/203,900 METHOD AND APPARATUS FOR PERFORMING BRANCH PREDICTION COMBINING STATIC AND DYNAMIC BRANCH PREDICTORS, Ser. No. 09/203,884; STATIC BRANCH PREDICTOR USING SPCODE OF INSTRUCTION PRECEDING CONDITIONAL BRANCH, U.S. Pat. No. 6,421,774; HYBRID BRANCH PREDICTOR WITH IMPROVED SELECTOR TABLE UPDATE MECHANISM, Ser. No. 09/434,984.

The branch target address predictor 302 includes a multiplexer 406 for providing an instruction pointer to instruction pointer register 321. Decode logic 402 controls multiplexer 406 to select an instruction pointer from one of five different sources based upon the x86 instruction decoded. In particular, decode logic 402 controls multiplexer 406 to select an instruction pointer based upon the branch type of decoded branch instructions.

The branch predictor 302 includes an incrementer 408 coupled to multiplexer 406. The incrementer 408 receives the instruction pointer from instruction pointer register 321 and, increments the instruction pointer by the length of the instruction fetched, i.e., by the number of bytes comprising the current instruction. Decode logic 402 controls multiplexer 406 to select the instruction pointer from incrementer 408 when decoding instructions that are not branch instructions, or when decoding a conditional branch instruction that is predicted not taken.

Multiplexer 406 also receives an actual target address from actual target address register 317. Decode logic 402 controls multiplexer 406 to provide the actual target address from actual target address register 317 to instruction pointer register 321 when the target address of a branch instruction was predicted incorrectly or when the outcome of a conditional branch instruction was incorrectly predicted.

The branch target address predictor 302 includes a call/return stack 411 for storing return addresses generated by call instructions. The call/return stack 411 comprises a first-in-last-out array of storage elements for storing the return addresses. Call instructions specify that a return address is to be pushed onto a stack in memory. Advantageously, according to the present invention, when decode logic 402 detects a call instruction, the return address is also pushed onto the call/return stack 411 from actual target address register 317 in addition to being pushed onto the memory stack.

Return instructions specify that a return address is to be popped off the memory stack. When decode logic 402 detects a return instruction, decode logic 402 controls call/return stack 411 to pop a return address off the call/return stack 411. The predicted return address popped off the call/return stack 411 is later checked by the execution and branch resolution logic 307, of FIG. 3, against the actual return address popped off the memory stack to determine if the predicted return address from the call/return stack 411 was correct.

Decode logic 402 controls call/return stack 411 to provide the predicted return target address to multiplexer 406 when a return instruction is decoded. Decode logic 402 also controls the multiplexer 406 to select the return address provided by the call/return stack 411 for storage in the instruction pointer register 321 when a return instruction is decoded. Advantageously, because return target addresses are stored in and predicted from the call/return stack 411, the predicted return addresses need not be stored in a branch target buffer 431, discussed below. Preferably, the call/return stack 411 stores return addresses for each of the types of call and return instructions shown in FIG. 2.

For a detailed description of the operation of the call/return stack 411, the reader is referred to U.S. patent application Ser. No. 09/271,591,entitled METHOD AND APPARATUS FOR CORRECTING AN INTERNAL CALL/RETURN STACK IN A MICROPROCESSOR THAT SPECULATIVELY EXECUTES CALL AND RETURN INSTRUCTIONS, having the same assignee, and hereby incorporated by reference.

The branch target address predictor 302 includes a direct target calculator 421 that calculates predicted target addresses of direct branch instructions. Direct target calculator 421 comprises an adder for adding target address components to generate a direct branch instruction target address. As described above, direct branch instructions, also referred to as PC-relative branch instructions, comprise branch instructions that specify the target address in terms of a displacement relative to an instruction pointer, or program counter (PC). Preferably, the direct target calculator 421 calculates predicted target addresses for conditional and unconditional near PC-relative branch instructions of FIG. 2.

The direct target calculator 421 receives a next sequential linear instruction pointer (NSLIP) 429. In an x86-compatible microprocessor, calculation of a linear address for a next sequential instruction involves the addition of three components: the current code segment base, an instruction pointer, and the length of the current instruction. The current code segment base is an address in memory defining the beginning of the code segment. The instruction pointer is an offset referenced to the current code segment base. The sum of these components is called the next sequential instruction linear address, NSLIP 429. Moreover, NSLIP 429 is updated during each cycle of the microprocessor 300 so that the fetcher 308 can fetch the next sequential instruction. The direct target calculator 421 also receives a displacement 409 of the direct branch instruction. The displacement 409 specifies a signed offset from the NSLIP 429.

The direct target calculator 421 adds the NSLIP 429 and displacement 409 to generate a predicted target address of the direct branch instruction. The predicted direct branch instruction target address is provided to multiplexer 406. Decode logic 402 controls multiplexer 406 to select the predicted direct branch instruction target address for provision to the instruction pointer register 321 upon detecting a direct branch instruction. Advantageously, because direct branch instruction target addresses are directly calculated by direct target calculator 421, predicted direct branch instruction target addresses need not be stored in a branch target buffer 431, discussed below.

Due to the fact that x86 instruction addresses may be calculated differently depending upon whether the microprocessor 300 is in a 16-bit or 32-bit mode, the predicted direct branch instruction target address generated by the direct target calculator 421 may require correction. Consequently, the execution and branch resolution logic 307 must determine whether the predicted target address generated by the direct target calculator 421 is correct. For a detailed description of operation of direct target calculator 421, the reader is referred to U.S. patent application Ser. No. 09/052,624, entitled APPARATUS AND METHOD FOR BRANCH TARGET ADDRESS CALCULATION DURING INSTRUCTION DECODE, having the same assignee, and hereby incorporated by reference.

The branch target address predictor 302 includes a branch target buffer 431 for storing target addresses of indirect branch instructions. The branch target buffer 431 is updated with actual target addresses received from actual target address register 317. The branch target buffer 431 is indexed by the instruction pointer stored in instruction pointer register 321. The branch target buffer 431 provides a predicted target address for indirect branch instructions to multiplexer 406. Decode logic 402 controls multiplexer 406 to select the predicted target address provided by branch target buffer 431 for provision to the instruction pointer register 321 when an indirect branch instruction is detected. The branch target buffer 431 will be described in more detail below with reference to FIG. 6.

Figure 5:
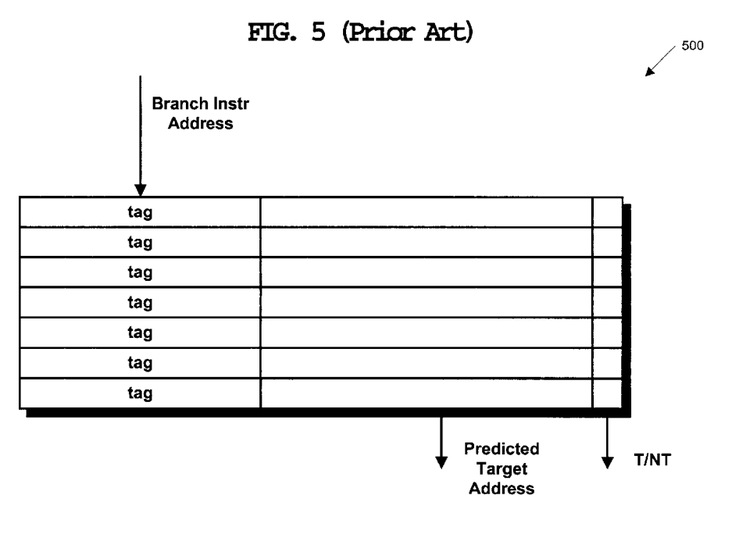
FIG. 5 is a related art block diagram of a typical branch target buffer.

Referring now to FIG. 5, a block diagram illustrating a related art branch target buffer 500 is shown. The branch target buffer 500 is typical of well known branch target buffers. Branch target buffer 500 is used to predict the outcome of a branch instruction, i.e., whether the branch will be taken or not taken, as well as to predict the target address of different types of branch instructions.

The branch target buffer 500 includes an array of entries indexed by an instruction address as shown. The lower bits of the instruction address are used to index into the array of entries. Each entry includes a predicted target address, a prediction of whether the branch will be taken or not taken, and an associated address tag.

When accessed, the branch target buffer 500 provides the predicted target address and the taken/not taken prediction from the selected entry. In addition, the associated tag field is compared with a portion of the instruction address to determine whether a hit has occurred in the branch target buffer 500. That is, the branch target buffer 500 determines whether the selected entry corresponds to the current instruction or to another instruction aliased to the same entry in the branch target buffer 500 as is well known in the art of branch prediction. Once the actual target address of the branch instruction is resolved later in the pipeline, the branch target buffer 500 is updated with the actual target address, thereby providing a predicted target address the next time the branch target buffer 500 entry is accessed.

Because branch target buffer 500 is used to predict whether a branch will be taken or not taken, branch target buffer 500 must consume entries in its array to store predictions about conditional branch instructions in addition to other types of branch instructions. In the case of an x86 processor, storing prediction information concerning conditional branch instructions includes storing prediction information regarding direct, i.e., PC-relative, branch instructions, as may be seen from FIG. 1. Furthermore, branch target buffer 500 may store branch prediction information for all types of branch instructions, including return instructions and branch instructions specifying an immediate target address. Thus, because branch target buffer 500 stores prediction information for multiple types of branch instructions, the likelihood of misprediction due to aliasing is greater than with a comparable sized BTB which stores target address predictions for only a single type of branch instruction.

Figure 6:
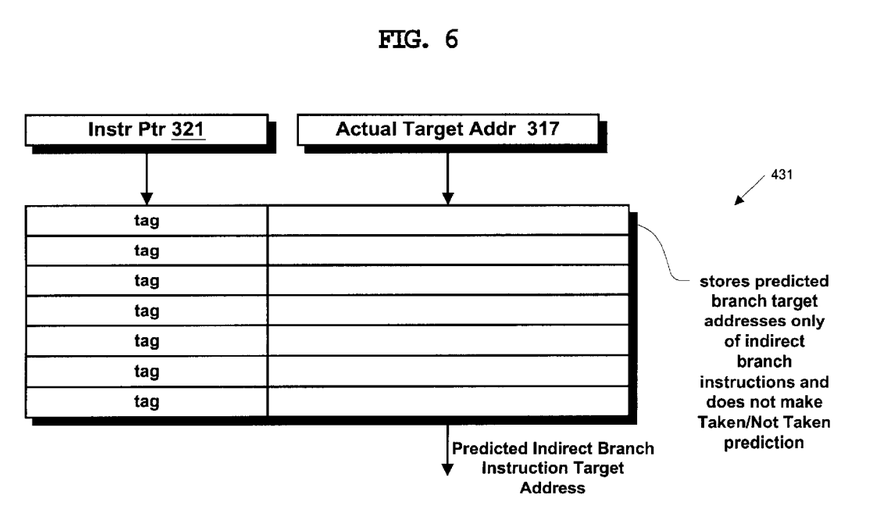
FIG. 6 is a detailed block diagram of the branch target buffer of FIG. 4 according to the present invention.

Referring now to FIG. 6, a block diagram illustrating in detail the branch target buffer 431 of FIG. 4 is shown. Branch target buffer 431 is indexed by the instruction pointer stored in instruction pointer register 321 to generate a predicted indirect branch instruction target address, and is updated with actual target addresses of previous executions of branch instructions from actual target address register 317.

In contrast to branch target buffer 500, branch target buffer 431 does not store target addresses of direct branch instructions or of return instructions, but only stores target addresses of indirect branch instructions. Additionally, branch target buffer 431 also does not store a prediction of the outcome of branch instructions, i.e., whether a branch instruction will be taken or not taken.

Advantageously, branch target buffer 431 does not need to store target addresses of return instructions since the call/return stack 411 of FIG. 4 stores predicted return target address of return instructions. It has been observed that the vast majority of the indirect branches comprise call or return instructions. Therefore, the remaining high level language constructs translated into indirect branch instructions, such as indirect procedure calls and case statements, are in the minority. Therefore, by eliminating return indirect branch entries from the branch target buffer 431, the likelihood of aliasing in the branch target buffer 431 is greatly reduced, resulting in potentially greater target address prediction accuracy.

Similarly, branch target buffer 431 of the present invention does not need to store target addresses of direct branch instructions since the direct target calculator 421 of FIG. 4 directly calculates the target address of PC-relative branches. Thus, the number of potential branch instructions for which the branch target buffer 431 will store target addresses is greatly decreased and the probability of "cluttering up" the branch target buffer 431 with unnecessary target addresses is reduced. This also potentially improves the likelihood of accurately predicting the target address of indirect branch instructions over the branch target buffer 500 of FIG. 5. That is, a branch target buffer 500 of comparable size as branch target buffer 431 is more likely to mispredict a target address due to another branch instruction aliasing into the same entry in the branch target buffer 500 than branch target buffer 431.

In one embodiment, the branch target buffer 431 includes 64 entries. The branch target buffer 431 is organized in a 16×4 way set associative arrangement of indirect branch instruction target addresses. The branch target buffer 431 is addressed by 4 bits of the instruction pointer. The tags comprise 16 bits of instruction address. One skilled in the art will understand that other branch target buffer 431 sizes, set associative configurations and indexing methods may be employed to benefit from the present invention.

In one embodiment, the branch target buffer 431 stores branch target addresses only of x86 near indirect JMP instructions. One skilled in the art with the benefit of the present disclosure will understand that other embodiments may also use the present invention to store target addresses of far indirect or immediate x86 JMP instructions or combinations thereof, keeping in mind the advantages of combining a call/return stack and direct branch instruction target address calculator with a branch target buffer to reduce the probability of collisions in the branch target buffer by eliminating return addresses and PC-relative target addresses from the branch target buffer. Furthermore, the present invention is not limited to x86 embodiments, but may be used in embodiments in which non-x86 indirect branch instructions, but not return addresses or PC-relative target addresses, are stored in the branch target buffer 431.

Figure 7:
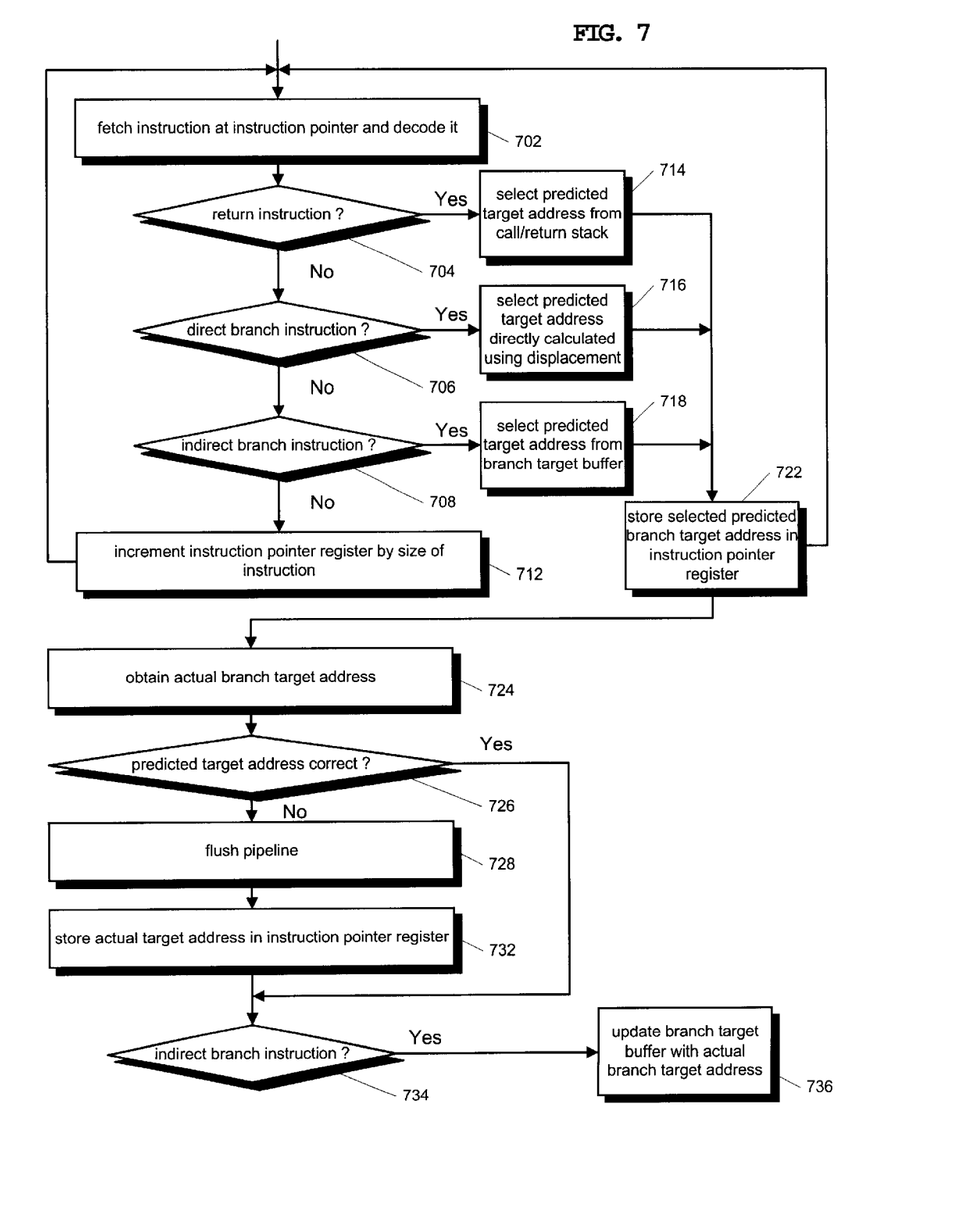
FIG. 7 is a flowchart illustrating operation of the branch target address prediction mechanism of FIG. 4 according to the present invention.

Referring now to FIG. 7, a flowchart illustrating operation of the microprocessor 300 of FIG. 3 including operation of the branch target address predictor 302 of FIG. 4 is shown. Fetcher 308 fetches an x86 instruction from the instruction cache 301 into the instruction buffer 311 using the instruction pointer from instruction pointer register 321 and branch target address predictor 302 decodes the fetched instruction, in step 702.

The decode logic 402 determines if the instruction is a return instruction, in step 704. If the instruction is a return instruction, then decode logic 402 controls multiplexer 406 t-o select the predicted target address popped from the call/return stack 411, in step 714.

The decode logic 402 determines if the instruction is a direct branch instruction, in step 706. If the instruction is a direct branch instruction, then decode logic 402 controls multiplexer 406 to select the predicted target address calculated by the direct target calculator 421, in step 716.

The decode logic 402 determines if the instruction is an indirect branch instruction, in step 708. If the instruction is an indirect branch instruction, then decode logic 402 controls multiplexer 406 to select the predicted target address generated by the branch target buffer 431, in step 718.

The selected predicted target address is stored in the instruction pointer register 321, in step 722. Control then returns back to step 702 for fetching of the next instruction at the updated instruction pointer.

If the instruction fetched and decoded in step 702 is not a branch instruction, then the instruction pointer is incremented by incrementer 408, in step 712. Control then returns back to step 702 for fetching of the next instruction at the updated instruction pointer.

If the instruction fetched and decoded in step 702 was a branch instruction, then the branch instruction proceeds down the microprocessor 300 pipeline to a stage where the actual branch instruction target address is obtained, in step 724. Step 724 is described in more detail with respect to FIG. 8.

The execution and branch resolution logic 307 determines if the predicted branch target address is correct by comparing the predicted target address stored in predicted target address register 326 with the actual target address stored in actual target address register 317, in step 726. If the predicted target address is incorrect, then the microprocessor 300 pipeline is flushed, in step 728. The actual target address is stored in the instruction pointer register 321, in step 732.

After the actual branch target address is obtained, a determination is made as to whether the branch instruction was an indirect branch instruction, in step 734. If the branch instruction was an indirect branch instruction, then the branch target buffer 431 is updated with the actual branch target address, in step 736.

Figure 8:
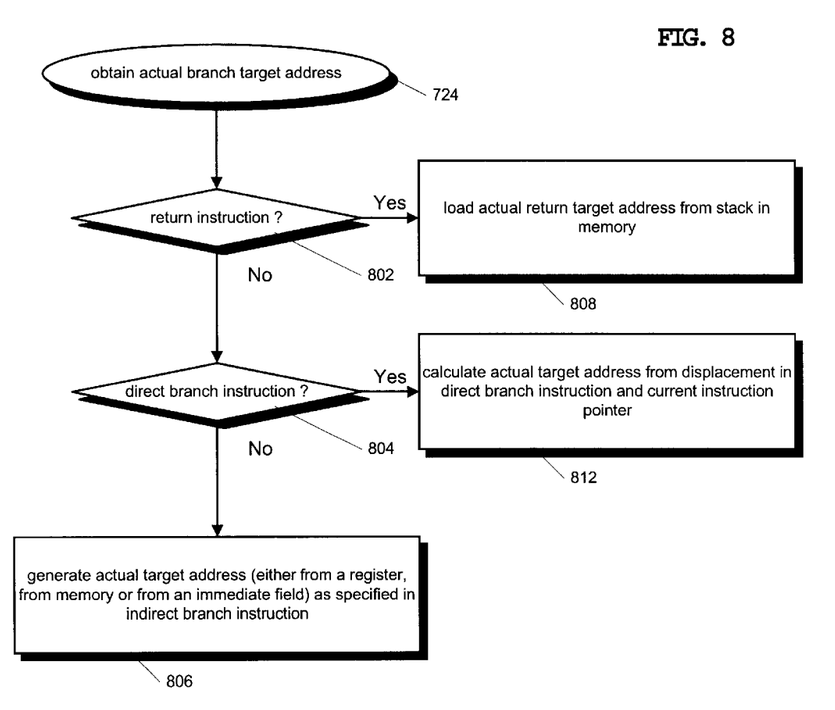
FIG. 8 is a detailed flowchart illustrating operation of a step of FIG. 7 according to the present invention.

Referring now to FIG. 8, a flowchart illustrating in detail step 724 of FIG. 7 is shown. A determination is made of whether the branch instruction is a return instruction, in step 802. If the branch instruction is a return instruction, then the actual return target address is loaded from the memory stack into the microprocessor 300, which may include a hit from the data cache 306, in step 808. Preferably, the actual return target address is loaded by the Data stage.

A determination is made of whether the branch instruction is a direct branch instruction, in step 804. If the branch instruction is a direct branch instruction, then the actual return target address is calculated by the address generator 305, in step 812.

If the branch instruction is not a return instruction or a direct branch instruction, then the actual target address of the branch instruction is calculated by the address generator 305, in step 806. The actual target address of the branch instruction is calculated as specified in the branch instruction, either from a register, from memory or from an immediate field in the branch instruction.

Although the present invention and its objects, features, and advantages have been described in detail, other embodiments are encompassed by the invention. For example, the branch target buffer may be indexed with an address of an instruction other than the address of the branch instruction being predicted. For example, the address of instructions previous to the branch instruction may be used instead in order to meet timing requirements.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus for predicting target addresses of branch instructions in a pipelined microprocessor, comprising:

a call/return stack, for storing target addresses, said target addresses related to return instructions;

an adder, for calculating target addresses, said target addresses related to direct branch instructions;

a branch target buffer, for storing target addresses, said target addresses related to indirect branch instructions; and decode logic, coupled to said stack, said adder and said buffer, for decoding an instruction, wherein said decoding comprises determining if said instruction is a return instruction, a direct branch instruction or an indirect branch instruction;

wherein the predictor selects a target address provided by one of said stack, said adder and said buffer for use by the microprocessor in fetching program instructions in response to determining if a branch instruction is a return, direct branch or indirect branch instruction, wherein said decode logic is configured to select said target address provided by one of said stack, said adder and said buffer based on said determining.

2. The apparatus of claim 1, wherein said branch target buffer stores target addresses related only to indirect branch instructions.

3. The apparatus of claim 1, wherein said direct branch instructions comprise branch instructions which specify said target addresses by a displacement comprised in said direct branch instruction.

4. The apparatus of claim 3, wherein said adder adds said displacement to an instruction pointer to calculate said target addresses.

5. The apparatus of claim 1, wherein said call/return stack comprises a plurality of storage elements comprised in the microprocessor, wherein said target addresses are stored in said plurality of storage elements in response to execution of a call instruction.

6. The apparatus of claim 1, wherein said branch target buffer does not predict whether said branch instruction will be taken.

7. A method for predicting branch target addresses, comprising:

fetching a branch instruction;

decoding said branch instruction after said fetching;

determining if said branch instruction is one of a return instruction, a direct branch instruction and an indirect branch instruction based on said decoding;

selecting a predicted target address of said branch instruction provided by one of a call/return stack, an adder and a branch target buffer, respectively, in response to said determining; and fetching a next instruction using said predicted target address in response to said selecting.

8. The method of claim 7, further comprising: obtaining an actual target address of said branch instruction after said fetching said next instruction using said predicted target address.

9. The method of claim 8, further comprising: updating said branch target buffer with said actual target address only if said branch instruction is an indirect branch instruction.

10. The method of claim 8, wherein said obtaining comprises generating said actual target address as specified in said branch instruction if said branch instruction is an indirect branch instruction.

11. The method of claim 8, further comprising: determining if said selected predicted target address correctly predicted said actual target address of said branch instruction.

12. The method of claim 11, further comprising: fetching a next instruction using said actual target address after said obtaining if said predicted target address incorrectly predicted said actual target address of said branch instruction.

* * * * *